United States Patent
Johnson et al.

(10) Patent No.: US 7,203,946 B2
(45) Date of Patent: Apr. 10, 2007

(54) SYSTEM AND METHOD FOR INTERCEPTING, INSTRUMENTING AND CHARACTERIZING USAGE OF AN APPLICATION PROGRAMMING INTERFACE

(75) Inventors: Brett Edward Johnson, Windsor, CO (US); Carol Lang, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 106 days.

(21) Appl. No.: 09/417,201

(22) Filed: Oct. 11, 1999

(65) Prior Publication Data

US 2003/0163602 A1    Aug. 28, 2003

(51) Int. Cl.
G06F 9/46    (2006.01)
G06F 9/44    (2006.01)

(52) U.S. Cl. .................. 719/318; 717/124; 719/328; 719/332

(58) Field of Classification Search ........ 709/201–219, 709/224, 300–328; 345/700–866; 717/120–135, 717/170; 719/328–332, 311–318; 707/203
See application file for complete search history.

(56) References Cited

U.S. PATENT DOCUMENTS

| 5,764,985 | A  | * | 6/1998  | Smale ...................... 719/328 |
| 5,946,486 | A  | * | 8/1999  | Pekowski ................. 717/128 |
| 6,282,703 | B1 | * | 8/2001  | Meth et al. .............. 717/163 |
| 6,314,470 | B1 | * | 11/2001 | Ward et al. .............. 709/328 |
| 6,584,491 | B1 | * | 6/2003  | Niemi et al. ............ 709/202 |
| 6,718,334 | B1 | * | 4/2004  | Han ........................ 707/102 |

* cited by examiner

Primary Examiner—Meng-Al T. An
Assistant Examiner—Charles Anya

(57) ABSTRACT

A system and method for generically intercepting any type of application programming interface (API) events. The API event interception system includes an intercept library and an API. The application program calls the API to process the client event generated. The API receives the request for service from the application program and determines if intercepting of events is enabled. If intercepting is enabled, the API sends the event to the intercept library. The intercept library determines that the intercept library is enabled to support the event. If the intercept library is enabled to support the event, the intercept library invokes the required event program. If the intercept library is not enabled to support the event, the intercept library returns a message instructing the API to process the event.

19 Claims, 11 Drawing Sheets

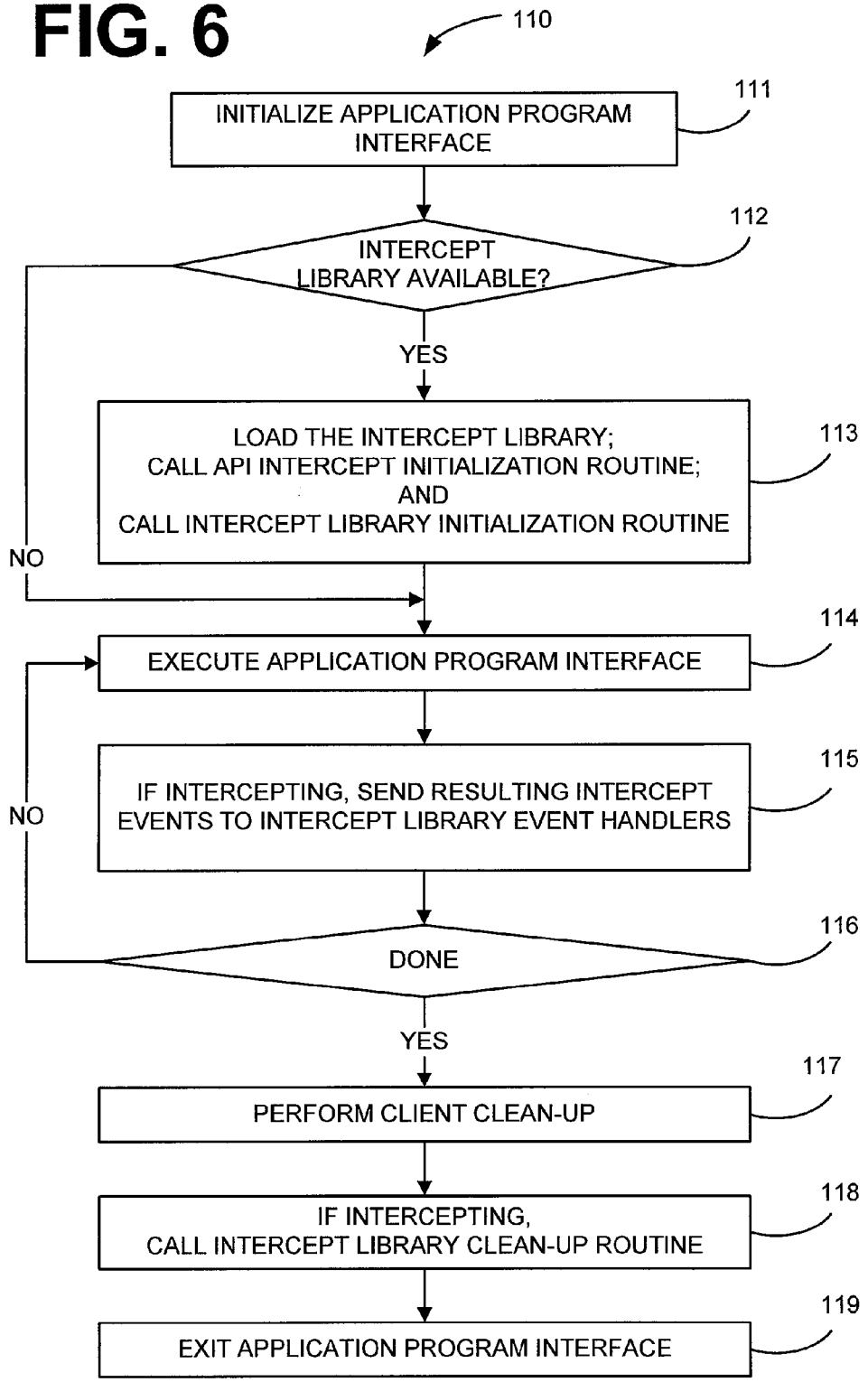

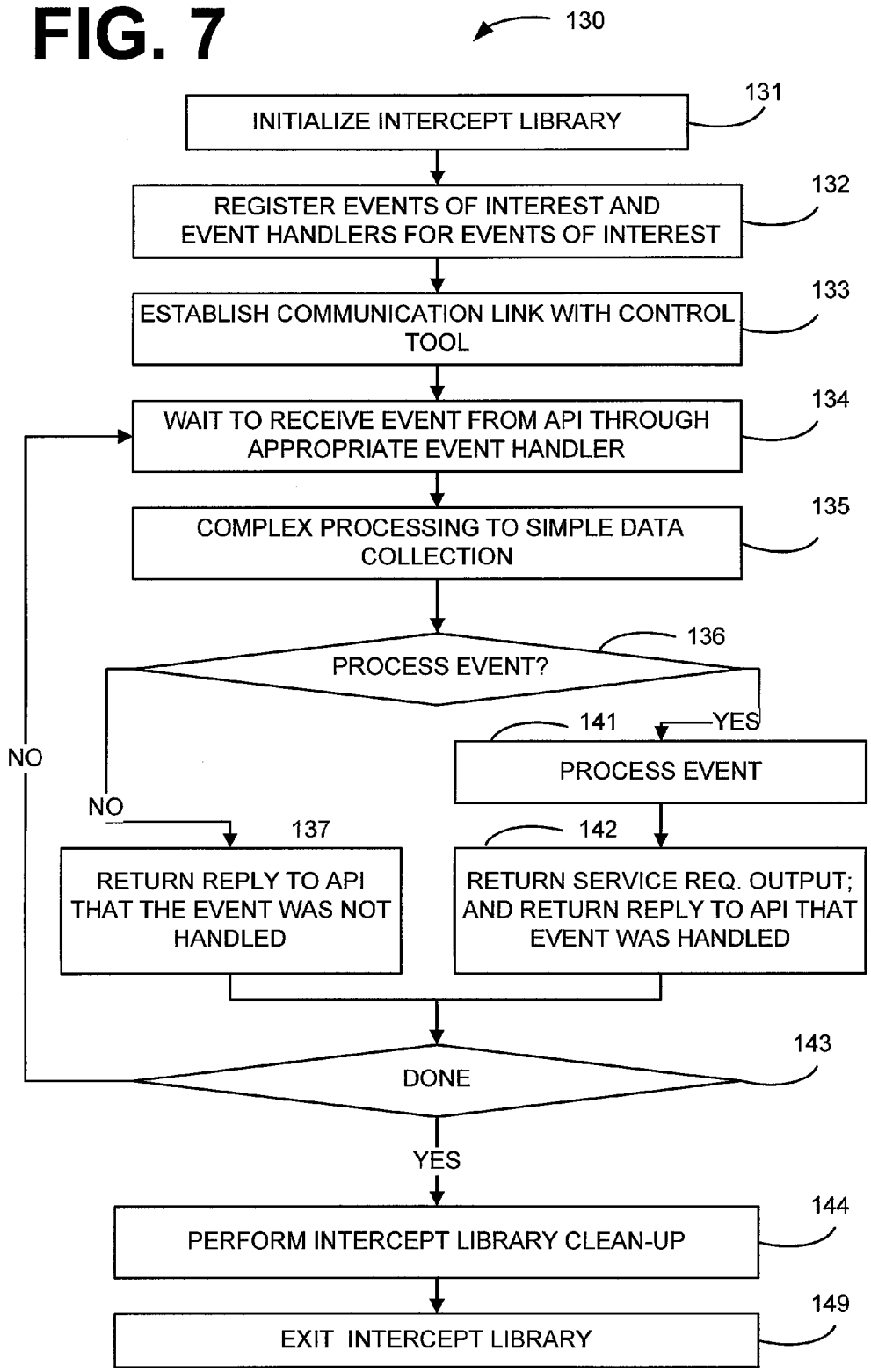

SYSTEM AND METHOD FOR INTERCEPTING, INSTRUMENTING AND CHARACTERIZING USAGE OF AN APPLICATION PROGRAMMING INTERFACE

BACKGROUND OF THE INVENTION

1. Field of the Invention

The present invention generally relates to computers and software, and more particularly, to providing a flexible system and method for generically instrumenting and intercepting any type of application programming interface events.

2. Description of Related Art

As known in the art, the intercepting of application program interface (API) events requires a large amount of tools-specific instrumentation code or relies upon the behavior of shared library dynamic symbol binding. Generally, the characterization code is contained in a shared library, which replaces the actual shared library for which the characterization is needed. The characterization code is for showing the right information about events. In some cases, this tools-specific instrumentation code is kept inside the API shared library. This then requires the addition of another shared communication library to accomplish the communication between the API library and the collection tool.

One well known way to intercept events is to replace the target API library with an "intercept" library that looks (to the system) exactly like the original target API library. Thus, when the application makes calls into the library, the replacement library's entry-point is called by the application, rather than the target library. The replacement library can then log the call (or do whatever it was designed to do), find the target library, load the appropriate entry-point from the target library and call it.

A significant problem with this approach is that each revision of the library requires that the intercept library be kept up to date, and also requires a new version.

Another significant problem is that the internal instrumentation code in the intercept library requires a significant amount of effort to maintain, and is usually only useful for a single collection tool.

Another problem with this approach is that the library being intercepted must be a shared library.

Still another significant problem is that the entry-point for the replacement library and the target library must be carefully maintained because they must be identical.

Until now, systems and methods for intercepting application programming interface events have lacked the ability to provide a flexible interface for intercepting all generic application programming interface events from any type of application programming interface.

SUMMARY OF THE INVENTION

The present invention provides a system and method for intercepting any application programming interface events generically. The system and method for intercepting any applications programming events generically provides cross platform capability, greater flexibility, higher performance, lower maintenance, and provides for easier creation and maintaining of the code for control tools.

Briefly described, in architecture, the system can be implemented as follows. An application program interface receives a request for service, and generates at least one event to complete the request for service. An intercept logic for processing an event, and a generic interception communication interface for transferring the event from the application program interface to the intercept logic if event intercepting is enabled The present invention can also be viewed as providing a method for intercepting any application programming interface events generically. In this regard, the method can be broadly summarized by the following steps: generating an event by an application program interface, transmitting the event to an intercept logic if event intercepting is enabled, determining if the event is to be processed by the intercept logic, and processing the event Other features and advantages of the present invention will become apparent to one with skill in the art upon examination of the following drawings and detailed description. It is intended that all such additional features and advantages be included herein within the scope of the present invention.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 6 is a flow chart of an example of the application programming interface process of the application programming interface event interception system of the present invention, as shown in FIG. 4A.

FIG. 7 is a flow chart of an example of the intercept library process of the application programming interface event interception system of the present invention, as shown in FIG. 4A.

DETAILED DESCRIPTION OF THE PREFERRED EMBODIMENT

The present invention will now be described in detail with specific reference to the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims.

The present invention provides a system and method for a flexible interface for control tools and intercepting any application programming interface (API) calls. A major benefit of the present invention allows for multiple control tools to use the same interface, and it does not place any restrictions on what form the API takes (i.e., it can be shared library, archived library, application, database, etc.). These tools can be any kind of tool that can make use of intercept information. For example, but not limited to, a tool that will write out a source file of OpenGL commands. This way, an arbitrary program can be run to capture some interesting behavior of that program to a source file. Then it is possible to compile and run the source file to duplicate the interesting behavior. Another example is a tool that analyzes OpenGL calling patterns for an application, and looks for any known patterns that may be inefficient. Still another example is a tool that is similar to a debugger. The debugger tool intercepts all OpenGL calls, and the user can get information about the call, step over the call, break on a specific call, etc.

The present invention also provides a generic instrumentation and interception interface that allows any control tool to handle API events generically. This means that the control tool does not have to know about all of the API events in advance, and hence, a properly designed control tool does not need to be updated whenever the API adds a new entry point or other control event. The instrumentation of the present invention eliminates nearly all of the maintenance work for extra instrumentation code within the API.

The present invention provides these capabilities on any arbitrary operating system such as, for example, but not limited to, Unix, Windows, HP-UX, Windows NT, Mac OS, and the like, and also provides improved performance over the prior art methodologies.

Figure 1:
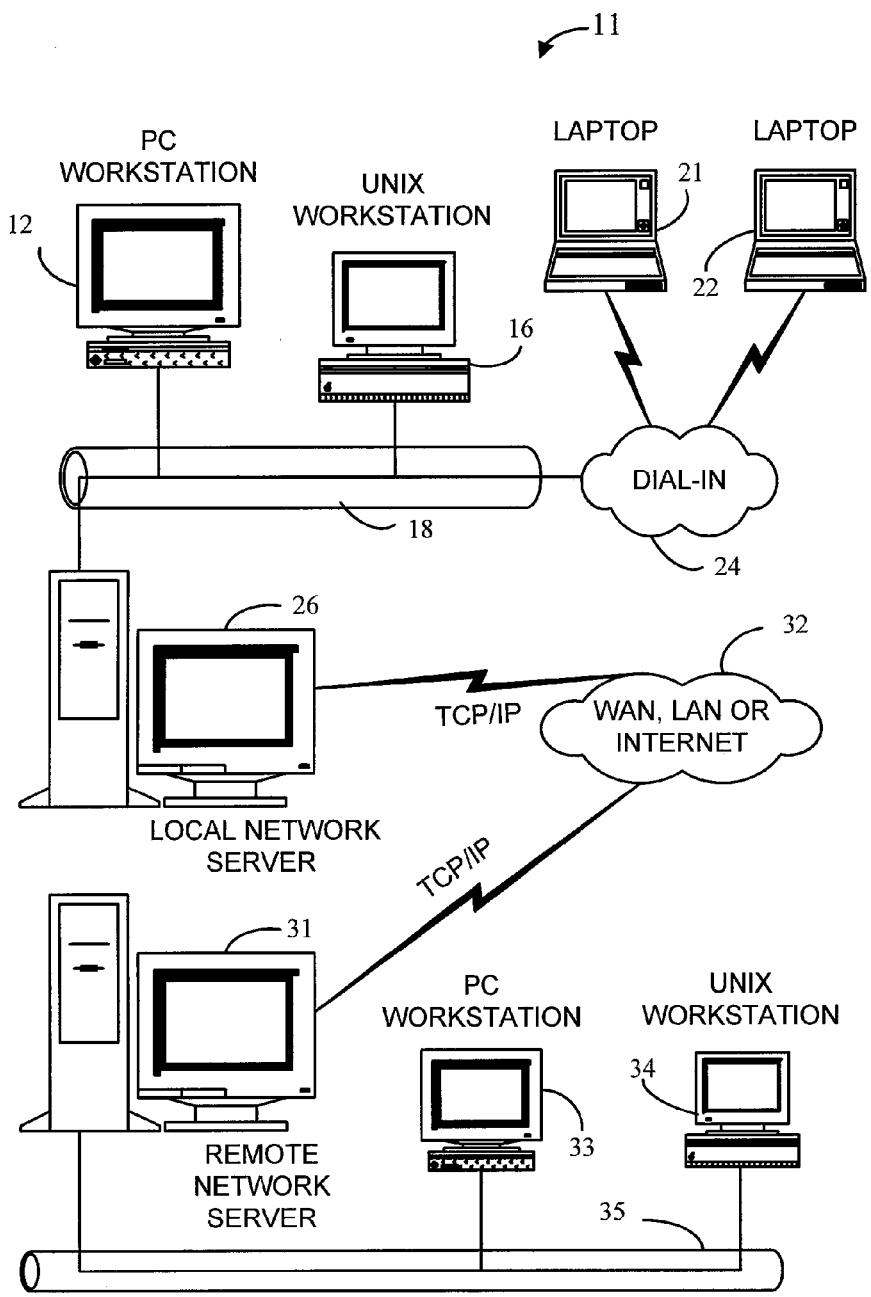
FIG. 1 is a block diagram of the client/server system utilizing a network.

Turning now to the drawings, FIG. 1 is a block diagram of just one system configuration that illustrates the flexibility, expandability, and platform independence of the present invention. While the system configuration could take many forms, the diagram of FIG. 1 illustrates a plurality of diverse workstations 12, 14 and 16 directly connected to a network, for example, but not limited to, a LAN 18. Additional workstations 21, 22 may similarly be remotely located and in communication with the network 18 through a dial-in or other connection 24. Each of the workstations in FIG. 1 is uniquely illustrated to emphasize that client workstations may comprise a diverse hardware platform.

Additional workstations 33 and 34 may similarly be located and in communication with the remote server 31 for access to data on the local server 26 and the remote server 31. Workstations 33 and 34 communicate with the remote server 31 on a LAN network 35. Networks 18 and 35 may be, for example but not limited to, Ethernet type networks, also known as 10 BASE 2, 10 BAS 5, 10 BSAF, 10 BAST, BASE BAN network, CO-EX cable, and the like.

Figure 2A:
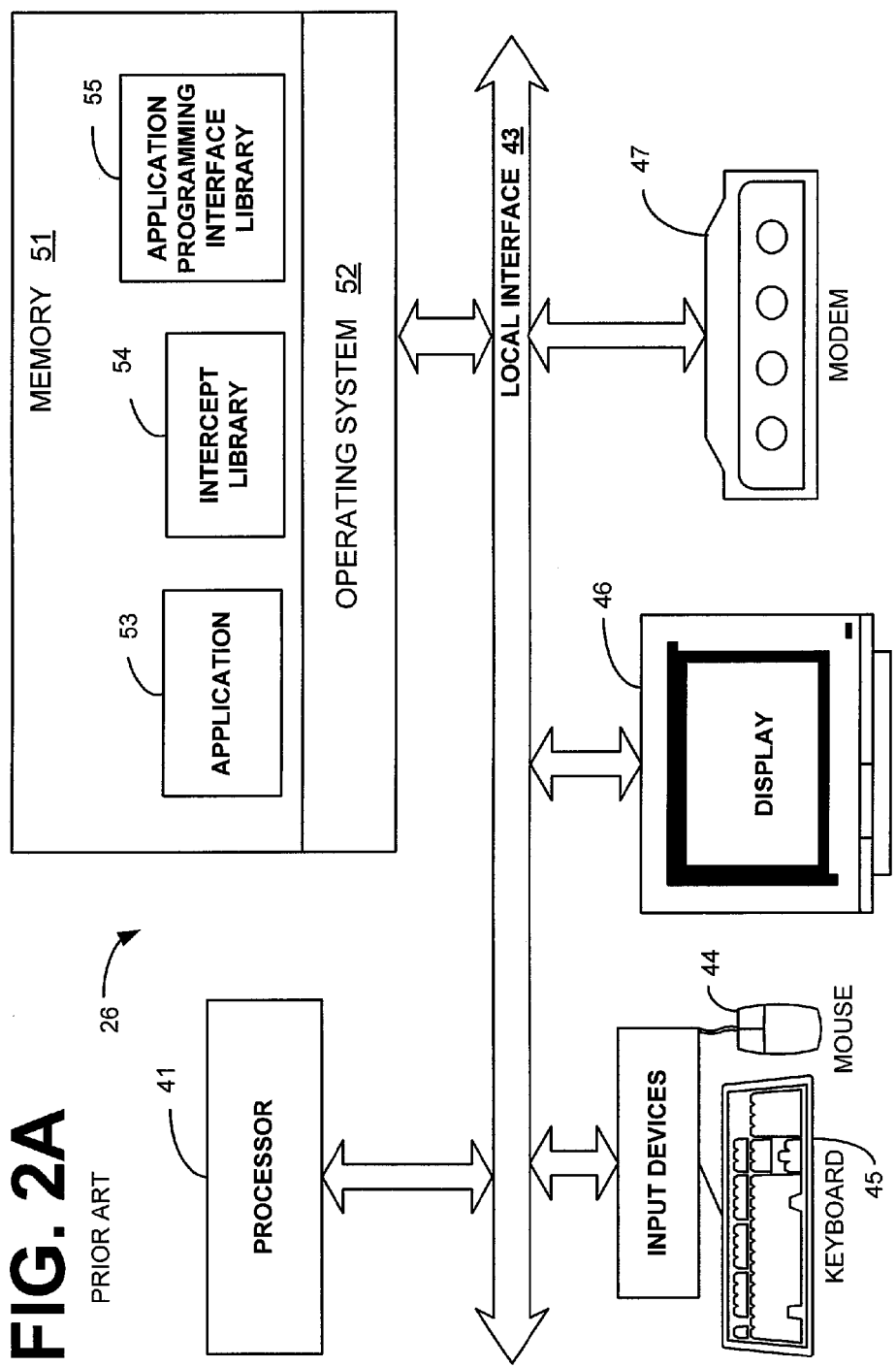
FIG. 2A is a block diagram illustrating a prior art application program, application programming interface and an intercept library situated within a computer readable medium, for example, in a computer system of the client system.

Illustrated in FIG. 2A, is a block diagram illustrating an example of a prior art API having event interception situated within a computer readable medium, for example, in a computer system of a server system 26. Server systems today include APIs, which are libraries that include a set of routines used by application programs to direct the performance of procedures and/or subroutines required by the application program. This implementation requires that both the API and intercept library must be shared libraries.

An example of API library 55 is OpenGL, which is a software interface to graphics hardware. As known in the art, Open GL's interface consists of about 120 distinct commands, which a user could utilize to specify the objects and operations needed to produce an interactive 3-dimensional display. In this example, API library 55 routines are generally designed to be hardware independent interfaces that are implemented on many different hardware platforms.

Server systems today access, and process these API library 55 resources required by an application program 53 by using the processor 41, storage device 42, and memory 51 with an operating system 52 and window manager 53. The processor accepts data from memory 51 and storage 42 over the bus 43. Directions from the user can be signaled to the server system by using the input devices such as, but not limited to, a mouse 44 and keyboard 45. The actions input and result output are displayed on a display device such as, but not limited to terminal 46.

Figure 2B:
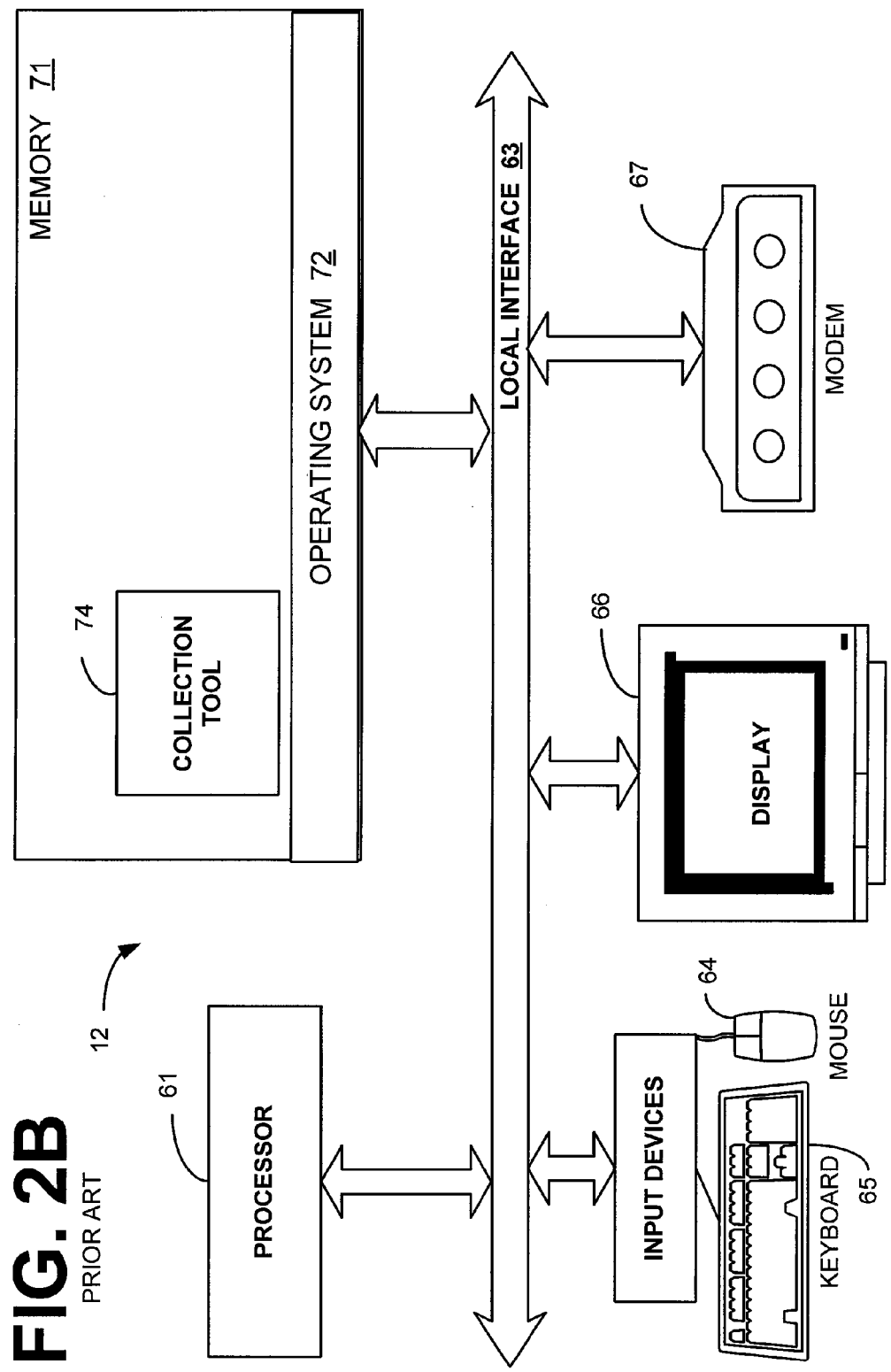
FIG. 2B is a block diagram illustrating a prior art collection tool process situated within a computer readable medium, for example, in a computer system of a server system.

Illustrated in FIG. 2B is a block diagram illustrating an example of a prior art collection tools 74 situated within a computer readable medium, for example, in a client computer system 12. Collection tools 74 are located in memory 71 of a client computer system.

The collection tool 74 is a tool that collects interception data for later use. For example, but not limited to, the prior example of a tool that creates source code from a sequence of intercepted OpenGL calls. The collection tool 74 runs, in connection with its intercept library. The collection tool 74 simply collects intercept data and saves it in a compact format to a file. Then, another tool is run that converts this compact file into source code. The reason for this is that it is much faster to just save the data to a compact file than it is to re-interpret it as source code and write out the source code file. Since the intercept/collection process happens while the target application is running, the interpretation and conversion to source code is done in real time. This same concept is useful for many kinds of analysis tasks, where one wants to capture some data, then spend time analyzing the data later when performance is not so important.

The architecture of the client computer system 12 is similar to the servers 31 and 26. The principal difference between the servers 31 and 26 and the clients 12, 16, 21, 22, 33 and 34, (FIG. 1) is that the client systems interface to the user and request the functionality through the network 18, 24, 32 or 35. Servers 26 and 31 generally provide the services requested by the client systems utilizing the application program 53, the intercept library 54, and API library 55.

Otherwise, the functionality of processor 61, storage 62, mouse 64, keyboard 65, display 66, and modem 67 are essentially the same as corresponding items of FIG. 2 described above. As known in the art, the client systems 12, 14, 16, 21, 22, 33 and 34, and server systems 26 and 27 may reside on the same physical machine.

Figure 2C:
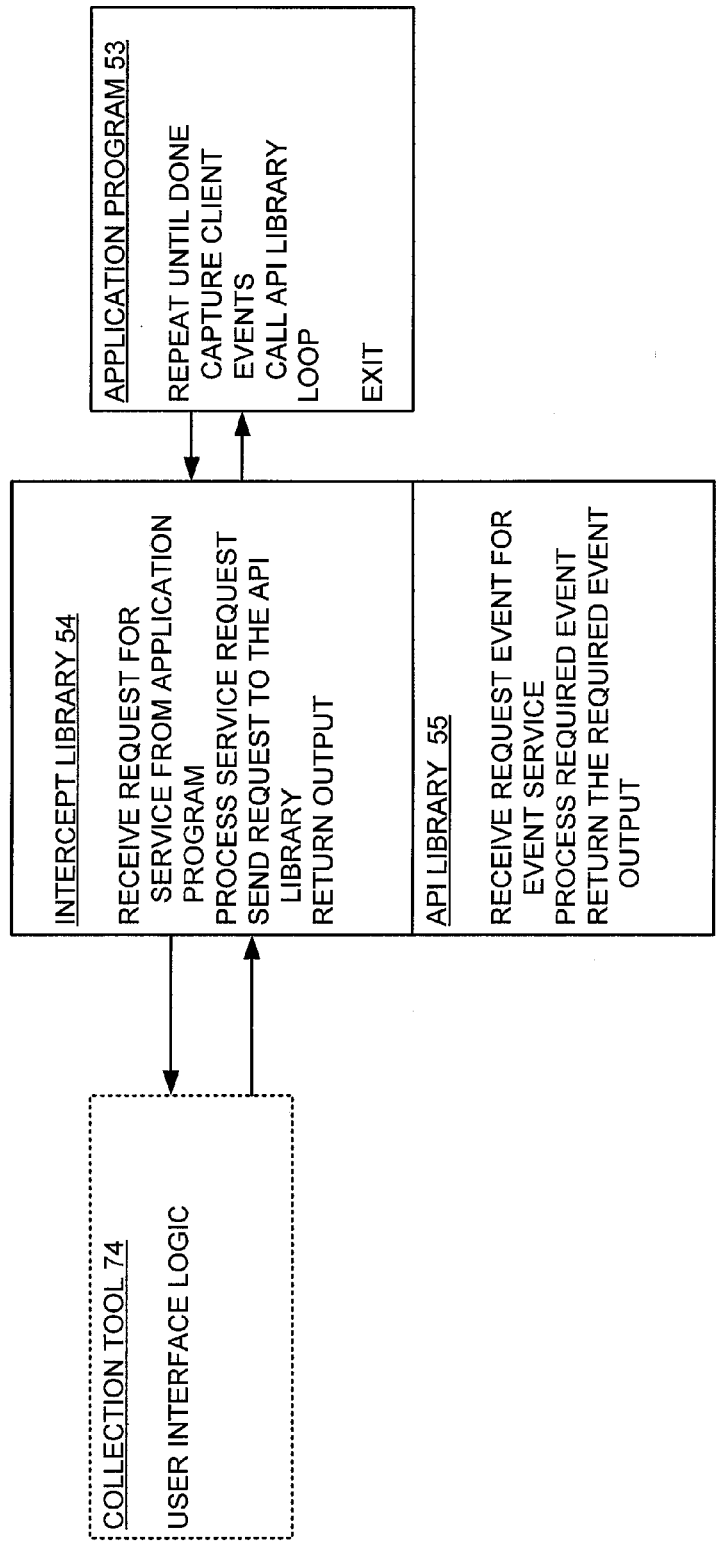
FIG. 2C is a block diagram illustrating the prior art process interaction between the application program, application programming interface and the collection tool process, for the events issued by an application program that are intercepted by the intercept library for reporting to the collection tools, as shown in FIG. 2A.

Illustrated in FIG. 2C is a block diagram illustrating a prior art process interaction for requests for service events issued by an application program 53, API library 55, intercept library 54 and the collection tool 74. These events are intercepted by the intercept library 54 for reporting to the collection tool 74, as shown in FIGS. 2(A&B). As can be seen, the application program 53 generates events, which are then transmitted to the intercept library 54.

The intercept library 54 receives the events (i.e. requests for service) from the application program 53 and attempts to find the required event routine for responding to the event generated by the application program 53. The intercept library 54 also determines if the event generated by application program 53 is event transaction to be addressed by the collection tool 74. If the event generated by application program 53 is an event to be addressed by the collection tool 74, the intercept library transmits a copy of the event to collection tool 74 for processing.

The intercept library 54 then transmits the event to the API library 55 for processing the event generated. The API library 55 processes the event generated and returns the required output to the intercept library 54, which in turn, returns the required output to the application program 53. The API library 55 in this diagram is simply a repository of code that is called by the intercept library 54.

One of the disadvantages with this architecture is that the intercept library 54 must look exactly like the API library 55. This is because the intercept library 54 completely replaces the API library 55 from the application program 53 perspective. So the application program 53 never communicates with the API library 55. Only the intercept library 54 communicates with the API library 55. This is why the intercept library 54 must look exactly like the API library 55, and why this configuration has the versioning problem. If any mismatches occur between the intercept library 54 and the API library 55, the event generated by the application program 53 will not be handled correctly and could cause an operation error.

Another disadvantage of this approach is that it relies on the behavior of shared libraries for its implementation. This approach relies on the fact that shared library entry-points are bound to the application 53 at run-time by the OS, and that by physically replacing the shared library with one that looks identical, the OS will cause the entry-points in the replacement library to be bound instead. Therefore, this approach can only be used to intercept an API library that is contained in a shared library, and can't be used at all on an operating system that doesn't support shared libraries (i.e. MS-DOS, CPM, Windows CE, etc . . . ).

Figure 3:
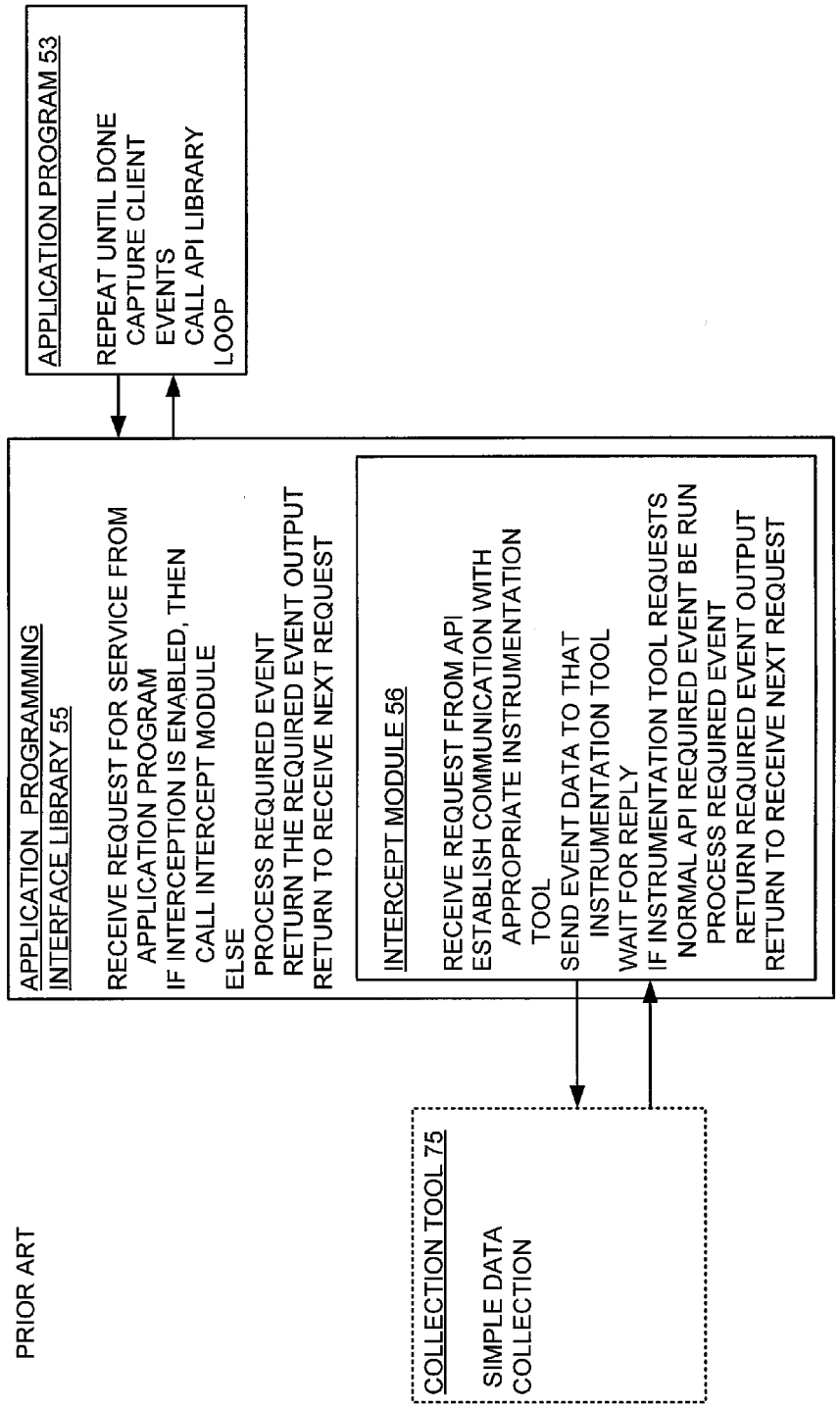
FIG. 3 is a block diagram illustrating a prior art process interaction between API library processing of events issued by an application program, that are intercepted by the intercept module for reporting to the collection tool.

Illustrated in FIG. 3 is a block diagram illustrating the prior art process interaction between an application program interface library 55 and events issued by an application program 53. When interception is enabled, the events issued by an application program 53 are decomposed into intercept events managed and communicated by the intercept module 56 wholly contained within the application programming interface library 55. In this case, the event data is sent directly from the intercept module 56 to the collection tool 75.

As shown, the application program 53 generates events and places a call to the API library 55. The API library 55 determines if interception is enabled. If interception is not enabled, the API library 55 processes the event and returns any event output. If interception is enabled, the API library 55 calls the intercept module 56 with the appropriate event information. The intercept module 56 receives the request from API library 55 and establishes a communication link with the collection tool 75. The intercept tool 56 sends the event to the collection tool 75 for processing. The intercept tool 56 then waits for a reply from the collection tool 75 regarding the event sent. Collection tool 75 then either processes the event or returns a message requesting normal API library 55 event processing. If the intercept tool 56 receives a message requesting normal API event processing, the intercept tool 56 performs the required API event processing. The intercept tool 56 then returns the required event output to be API library 55 and waits to receive the next request.

The disadvantage to this architecture is that every intercepted event (i.e. API call) is sent by the intercept tool 56 over a communication link to the collection tool 75. Then the intercept tool 56 has to wait for the collection tool 75 to respond (again, over a communication link), so that it knows how to proceed (i.e. whether to call the "real" entry-point, etc . . . ). This process is horribly inefficient, and slows down the intercepted process tremendously. Also, this architecture doesn't solve the version synchronization problem (i.e. the collection tool 75 has to be the same version as the intercept module 56, which has to be the same version as the API library 55.

Figure 4A:
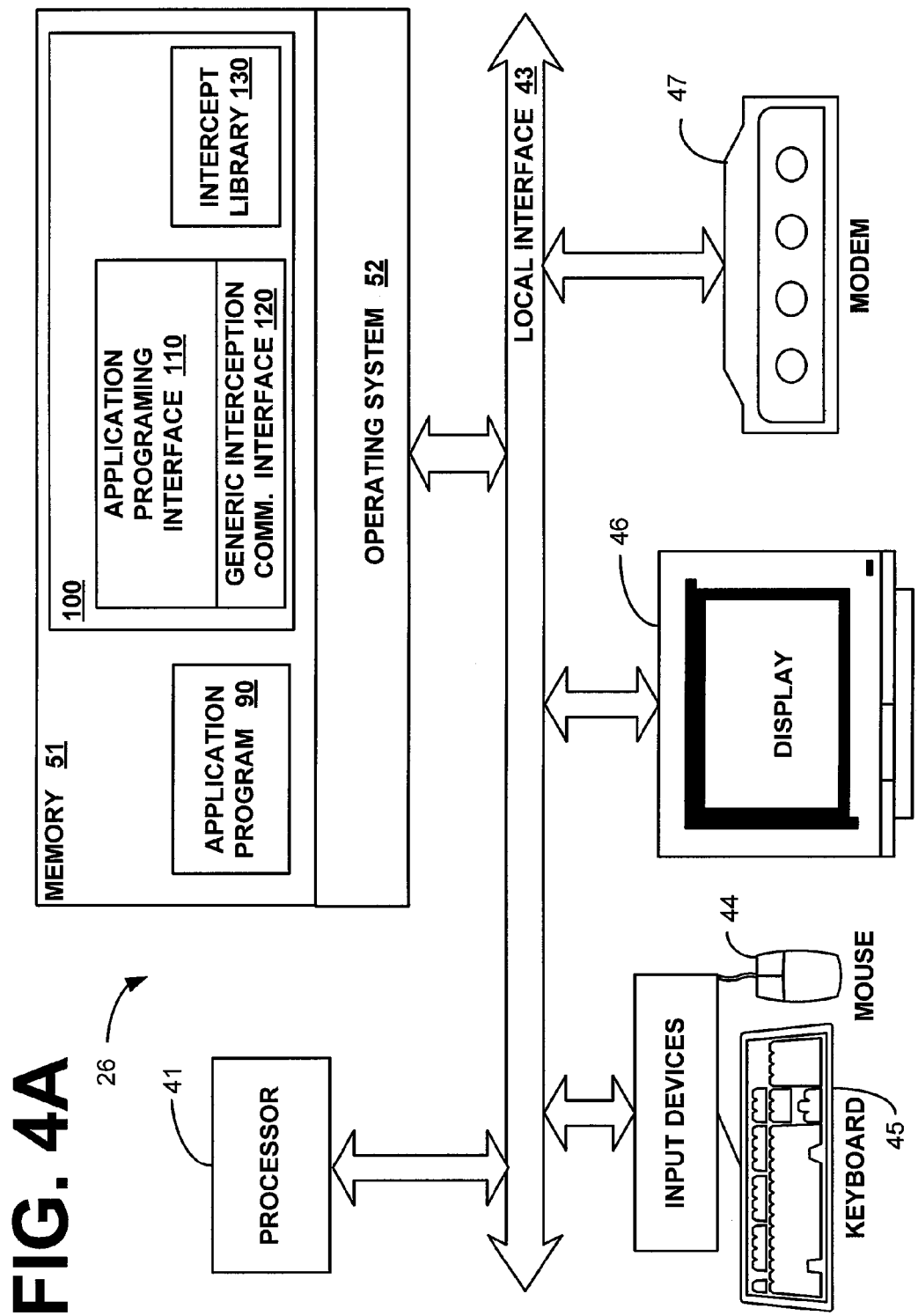
FIG. 4A is a block diagram illustrating an application program, application programming interface, generic interception communication interface and event interception library of the present invention, situated within a computer readable medium, for example, in a computer system of the client system.

Illustrated in FIG. 4A is a block diagram illustrating an API event interception system 100 of the present invention, situated within a computer readable medium 51, for example, in a computer system. As shown, the API event interception system 100 of the present invention includes an API 110, generic interception communication interface 120 and intercept library 130. The application program 90, API 110, generic interception communication interface 120 and intercept library 130 all reside in memory 51 of the a server system 26 or 31 as herein previously defined with regard to FIG. 2.

Figure 4B:
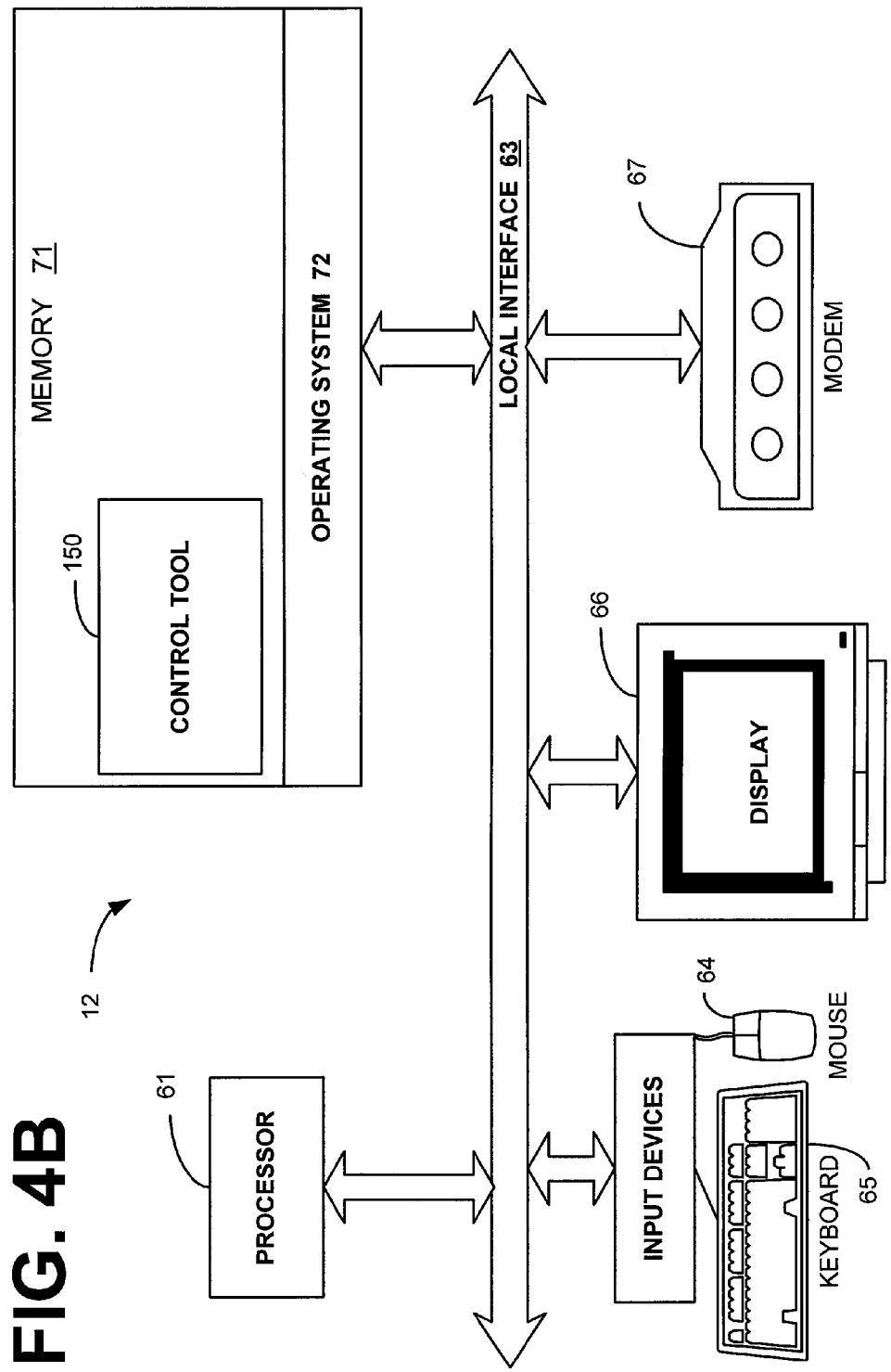
FIG. 4B is a block diagram illustrating a control tool process of the present invention situated within a computer readable medium, for example, in a computer system of a server system.

Illustrated in FIG. 4B is a block diagram illustrating control tool 150 process situated within a computer readable medium, for example, in a computer system. As shown, the control tool 150 resides in memory 71 of client system 12 as previously defined with regard to the collection tool 74 (FIG. 2C). The control tool 150 provides a user interface with which the user controls the actions of the intercept library 130 (i.e. whether the intercept library 130 should intercept specific events, what it should do with the events it does capture, etc.

Figure 4C:
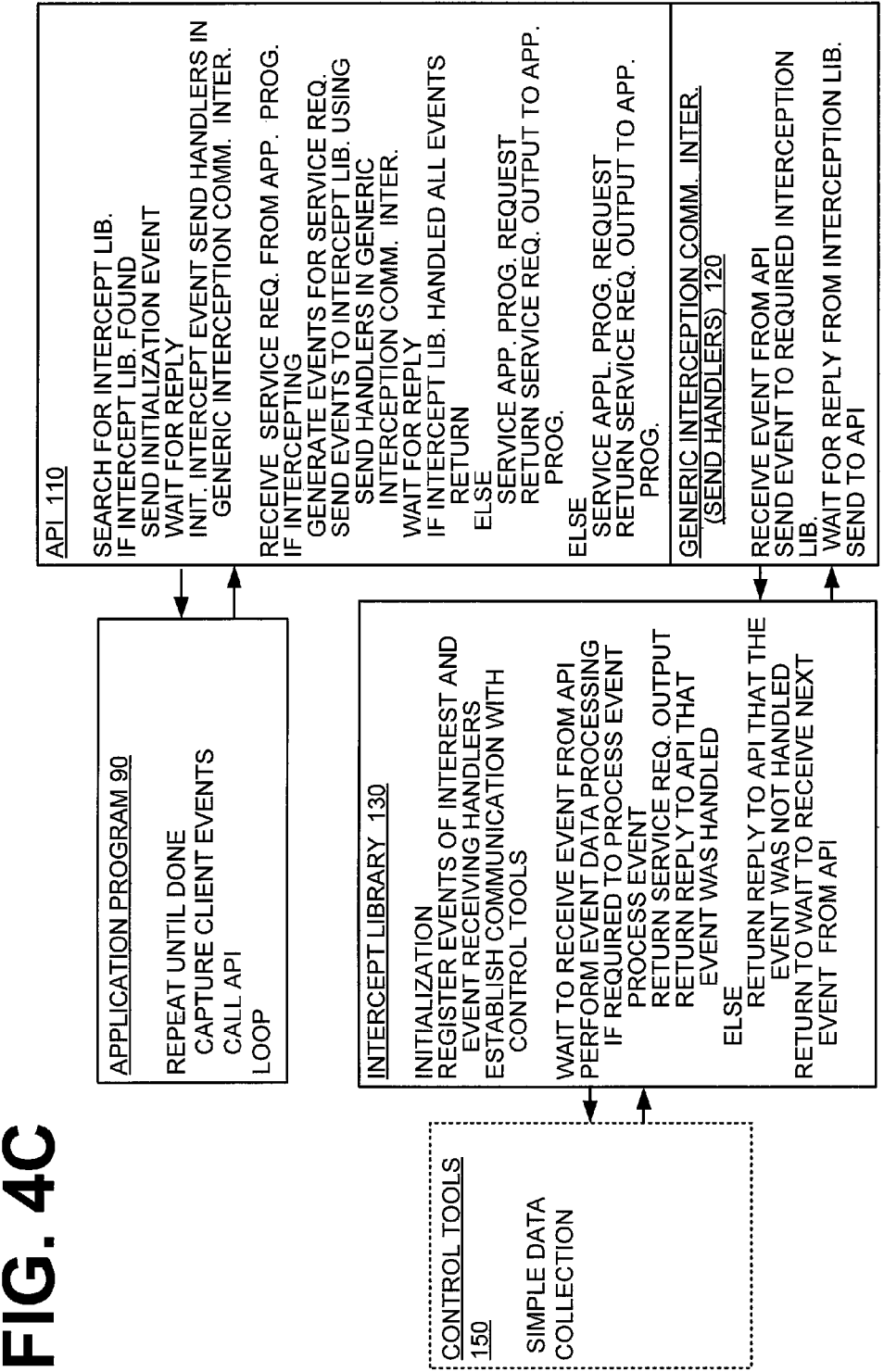
FIG. 4C is a block diagram illustrating a process interaction between application program interface and events issued by an application program, that are intercepted by the intercept library using the application programming interface event interception system of the present invention, as shown in FIGS. 4A and 4B.

Illustrated in FIG. 4C is a block diagram illustrating a process interaction between application program 90, application program interface 110, generic interception communication interface 120 and the control tools 150 of the present invention. The intercept library 130 of the present invention intercepts these events for processing, under the direction of the control tools 150, as shown in FIGS. 4A and 4B. The control tools 150 can be any kind of tool that can make use of intercept information.

Upon start-up of application program 90 and prior to receiving a client event, the API 110 performs the initialization process. The API 110 initializes the intercept event send handlers in the generic interception communication interface 120. The API 110 also searches for the intercept library 130. If the intercept library 130 is found the API 110 sends an initialization event to the intercept library 130. The intercept library 130 initialization includes registering events of interest and event receiving handlers, and then establishing communication with control tool 150.

As shown, the application program 90 processes data and creates client events for service. The application program 90 calls the API 110 to process the client event generated. The API 110 receives the request for service from the application program 90. The API 110 then determines if the intercept library 130 is enabled to handle events. If the API 110 determines that the intercept library 130 is not enabled to support the event, the API 110 processes the event and returns the event output to the application program 90.

If the API 110 determines that the intercept library 130 is enabled to support the event, the API 110 calls the intercept library 130 through the generic interception communication interface 120 to allow the intercept library 130 to process or handle the event. API 110 waits for a reply from the intercept library 130. If the intercept library 130 returns that it was able to process the event the API 110 waits to receive the next request for service of the application program 90. If the intercept library 130 was not able to process the event, the API 110 processes the event and returns the event output to the application program 90.

The intercept library 130 receives the request for service event from the API 110. The intercept library 130 contains code to handle or process a number of events. The intercept library 130 then determines if processing of the received event is required. If event processing is required the intercept library 130 invokes the required event program to process the event. The intercept library 130 returns any output to the API 110 for further transmission to the application program 90. If the intercept library 130 is not required to process the event, the intercept library 130 sends a reply to API 110 that the event was not processed.

It is important to note that in the present invention, the events are captured and processed by the intercept library, and only controlling information need be sent over a communication link between the control tools 150 (which, by necessity is running in a different process) and the intercept library 130. Communication between processes is inherently very slow. But communication between code fragments in the same process (i.e. between the intercept library 130 and the API 110) is very fast. It's very important to understand that, in the present invention, the control tools 150 do not process the individual events. Rather, the intercept library 130 (which resides in the same process as the application 100 and API 110) will process each event, according to the control information it receives from the control tools 150

Figure 5:
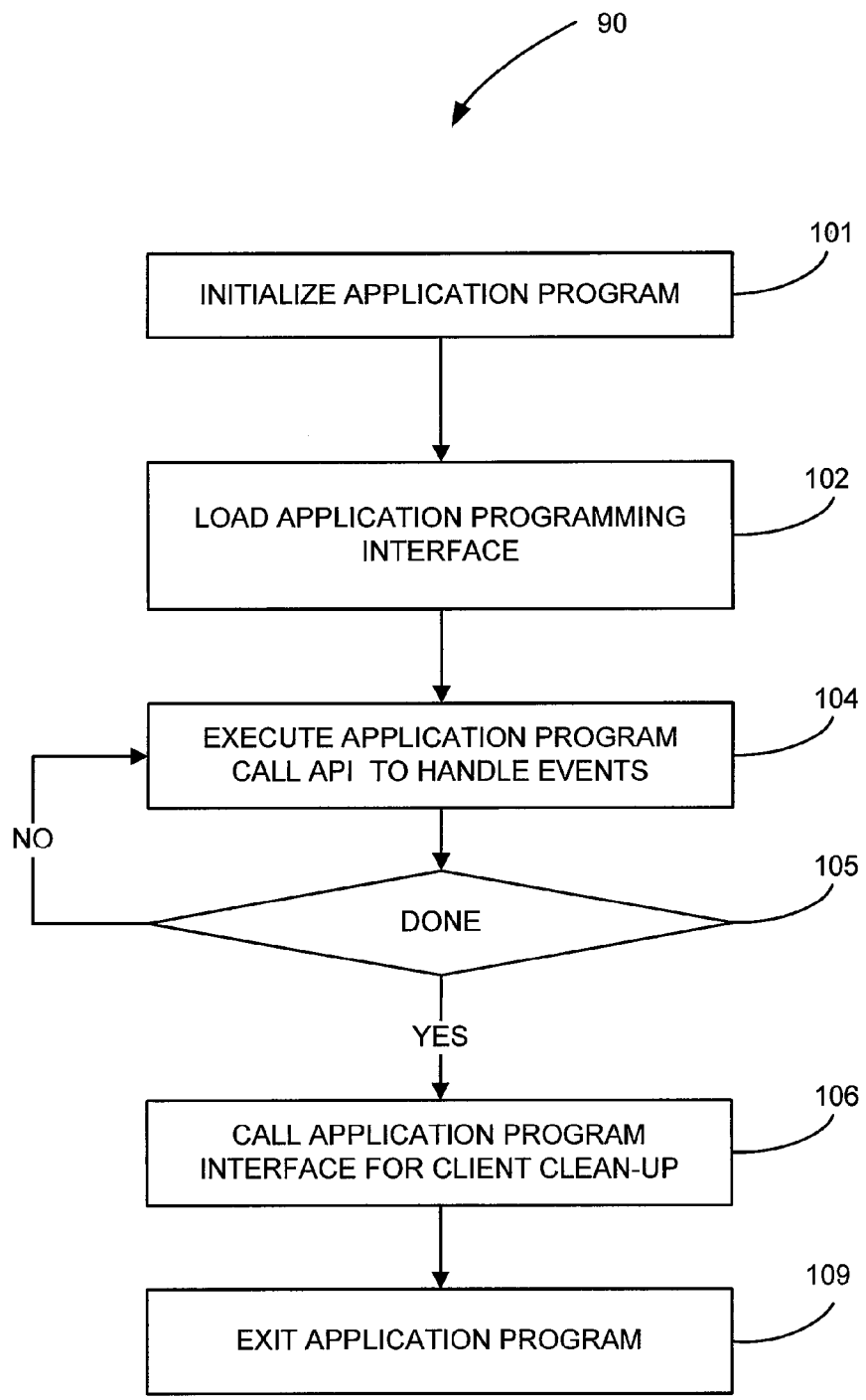
FIG. 5 is a flow chart of an example of an application program of the application programming interface event interception system of the present invention, as shown in FIG. 4C.

Illustrated in FIG. 5 is a flow chart of an example of the application process 90, as shown in FIGS. 4(A&C). First, the application program 90 is initialized at step 101. The application program 90 then loads and initializes the API 110 at step 102.

Next, the application program 90 begins normal execution, and makes calls to the API 110 to handle events at step 104. The application program then checks whether the normal execution of the application program 90 is done at step 105. If the application program 90 is not done, the application program 90 returns to step 104 to continue execution of the application program and to call an API 110 to continue to handle events at step 104.

If the application program 90 is done, the application program calls the application program interface 110 for client cleanup at step 106. The application program 90 then exits at step 109.

Illustrated in FIG. 6 is a flow chart of an example of the process for the API 110 of the present invention, as shown in FIGS. 4(A&C). First, the API 110 is initialized at step 111. Then, the API 110 determines if an appropriate intercept library 130 exists at step 112. If the appropriate intercept library 130 does not exist, the API 110 skips to step 114.

If the appropriate intercept library 130 exists, the API 110 loads the appropriate intercept library 130, calls the API intercept initialization routine and the intercept library initialization routine at step 113. The API intercept initialization routine includes be initialization of the intercept event send handlers in the generic interception communication interface 120, herein previously defined with regard to FIG. 4C. The intercept library initialization routine includes, registering events of interest and event receiving handlers, and then establishing communication with control tool 150, herein previously defined with regard to FIG. 4C.

At step 114, the application program interface 110 starts normal execution. If the API 110 is performing interception, then the API 110 sends resulting intercept events to the intercept library event handlers in the generic interception communication interface 120. The generic interception communication interface 120 sends resulting intercept events to the intercept library 130 to handle events at step 115. Routinely, the API 110 checks to see if the application program 90 execution is done at step 116. If application program 90 is not done, the API 110 returns to step 114 for continued execution. If the application program 90 is done, then the API 110 performs the client clean-up process at step 117, and if intercepting, calls the intercept library clean-up routine at step 118. The API 110 then exits at step 119.

Illustrated in FIG. 7 is a flow chart of an example of the intercept library 130 of the present invention, as shown in FIGS. 4(A&C). First, the intercept library 130 is initialized at step 131. The intercept library 130 registers the events at interest and the event handlers for the events of interest at step 132. At step 133, the intercept library 130 establishes a communication link with the control tools 150.

The intercept library 130 begins normal processing and waits to receive the event from the API 110 through the appropriate event handler at step 134. Upon receiving an event from the API 110, the intercept library 130 processes the event data. At step 136, the intercept library 130 determines if the intercept library 130 is to perform API type processing. If the intercept library 130 determines that API type processing of the event is not enabled for the intercept library 130, the intercept library 130 returns a reply to the API 110 that the event was not handled.

If the intercept library 130 determines that API type processing of the event is enabled, the intercept library 130 performs API type processing of the event at step 141. At step 142, the intercept library 130 returns the event output and a reply to the API 110 at the event was handled.

Next, the intercept library 130 checks for a done status at step 143 and returns to continue processing events at steps 134–142, if not done. If the intercept library 130 determines that the done status is true, the intercept library 130 performs the intercept library cleanup at step 144. The intercept library 130 exits at step 149.

The API event interception system 100, comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical).

Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The block diagrams and flow charts of FIGS. 4A–8 show the architecture, functionality, and operation of a possible implementation of the API event interception system 100 software FIG. 4A. In this regard, each block represents a module, segment, or portion of code, which comprises one or more executable instructions for implementing the specified logical function(s). It should also be noted that in some alternative implementations, the functions noted in the blocks may occur out of the order noted in the figure. For example, blocks shown in succession may in fact be executed substantially concurrently or the blocks may sometimes be executed in the reverse order, depending upon the functionality involved.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A method for intercepting an event, the method comprising:
   generating an event with an application program;
   calling an application program interface to process the event;
   receiving the event with the application program interface;
   determining with the application program interface if an intercept library is enabled to process the event;
   if the intercept library is enabled to process the event, calling the intercept library with the application program interface through a generic interception communication interface having at least one intercept event send handler, the generic interception communication interface maintaining communication between the application program interface and the intercept library;
   transmitting the event to the intercept library with the at least one send handler of the generic interception communication interface;
   determining at the intercept library if the event is to be processed by the intercept library; and
   if the event is to be processed by the intercept library, processing the event with the intercept library.

2. The method of claim 1, further including:
   defining a plurality of events to be intercepted.

3. The method of claim 2, wherein determining if the event is to be processed by the intercept library further includes:
   finding the event to be processed in the plurality of events to be intercepted.

4. The method of claim 1, wherein the event is selected from the group consisting of function calls and operating system calls.

5. The method of claim 1, wherein processing the event includes:
   sending a message enabling the application program interface to process the event if the intercept library cannot process the event.

6. The method of claim 1, wherein processing the event comprises invoking with the intercept library an event program that processes the event.

7. The method of claim 1, further comprising returning an output from the intercept library to the application program interface for transmission to the application program.

8. An event interception system for generic interception of events, comprising:
   a processor;
   a memory;
   means for calling application program interface means to process an event generated by an application program;
   application program interface means for;
      receiving the event,
      determining whether any intercepting means is enabled to process the event, and
      if the intercepting means is enabled to process the event, calling the intercepting means through a generic interception communication interface having at least one intercept event send handler, the generic interception communication interface maintaining communication between the application program interface and the intercepting means, the send handler being configured to transmit the event to the intercepting means;
   means for determining if the event is to be processed by the intercepting means; and
   intercepting means for receiving and processing the event if the event is to be processed by the intercepting means.

9. The event interception system of claim 8, further comprising:
   means for defining a plurality of events to be intercepted.

10. The event interception system of claim 9, wherein the means for determining whether any intercepting means is enabled comprises:
    means for finding the event to be processed in the plurality of events to be intercepted.

11. The event interception system of claim 8, wherein the event is selected from the group consisting of function calls and operating system calls.

12. The event interception system of claim 8, further comprising:

means for sending a message enabling the processing means to process the event if the intercepting means cannot process the event.

13. The event interception system of claim 8, wherein the intercepting means comprises means for invoking an event program that processes events.

14. The event interception system of claim 8, further comprising means for returning an output from the intercepting means to the means for receiving and processing an event.

15. A computer-readable memory that stores an event interception system for generic interception of events, the system comprising:
 an application program interface that is configured to receive events generated by an application program, the application program interface further being configured to determine if an intercept library is enabled to process the events and, if so, call the intercept library through a generic interception communication interface;
 an intercept library that is configured to determine if events are to be processed by the intercept library and, if so, process the events; and
 a generic interception communication interface that is configured to transmit events from the application program interface to the intercept library when the intercept library is determined to be enabled to process the events, the generic interception communication interface having at least one intercept event send handler for maintaining communication between the application program interface and the intercept library.

16. The computer-readable memory of claim 15, wherein the events are selected from the group consisting of function calls and operating system calls.

17. The computer-readable memory of claim 15, wherein the intercept library is configured to send messages enabling the application programming interface to process events if the intercept library cannot process the events.

18. The computer-readable memory of claim 15, wherein the intercept library is further configured to invoke an event program that processes events.

19. The computer-readable memory of claim 15, wherein the intercept library is further configured to return an output to the application program interface.

* * * * *